United States Patent [19]

Nitanda et al.

[11] Patent Number: 4,458,796
[45] Date of Patent: Jul. 10, 1984

[54] NORMAL AND REVERSE ROTATING MECHANISM

[75] Inventors: Hiroshi Nitanda, Tokyo; Morikazu Mizutani, Kawasaki, both of Japan

[73] Assignee: Canon Kabushiki Kaisha, Tokyo, Japan

[21] Appl. No.: 284,111

[22] Filed: Jul. 16, 1981

[51] Int. Cl.³ .............................................. F16D 21/02
[52] U.S. Cl. ..................................... 192/51; 192/48.9; 192/48.92
[58] Field of Search ................ 192/21, 48.92, 51, 415, 192/48.9; 74/33

[56] References Cited
U.S. PATENT DOCUMENTS
3,313,170 4/1967 Lacy et al. ............................ 192/51

Primary Examiner—Cornelius J. Husar
Assistant Examiner—Joseph A. Fischetti
Attorney, Agent, or Firm—Fitzpatrick, Cella, Harper & Scinto

[57] ABSTRACT

A normal and reverse rotating mechanism of this invention includes a normal and reverse rotating member capable of normal and reverse rotations, a first rotation transmitting member for transmitting normal rotation to the normal and reverse rotating member, a second rotation transmitting member for transmitting reverse rotation to the normal and reverse rotating member, a drive source rotatable in one direction for imparting a rotational drive to the normal and reverse rotating member, first spring clutch means for operatively associating the first rotation transmitting member and the drive source with each other, second spring clutch means for operatively associating the second rotation transmitting member and the drive source with each other, and control lever means for controlling the first and second spring clutch means so that when one of the two spring clutch means is operatively associated with the drive source, the other spring clutch means is not operatively associated with the drive source. The invention does not require normal and reverse rotations of the drive source itself and does not require a bulky and complicated mechanism such as an electromagnetic clutch.

4 Claims, 6 Drawing Figures

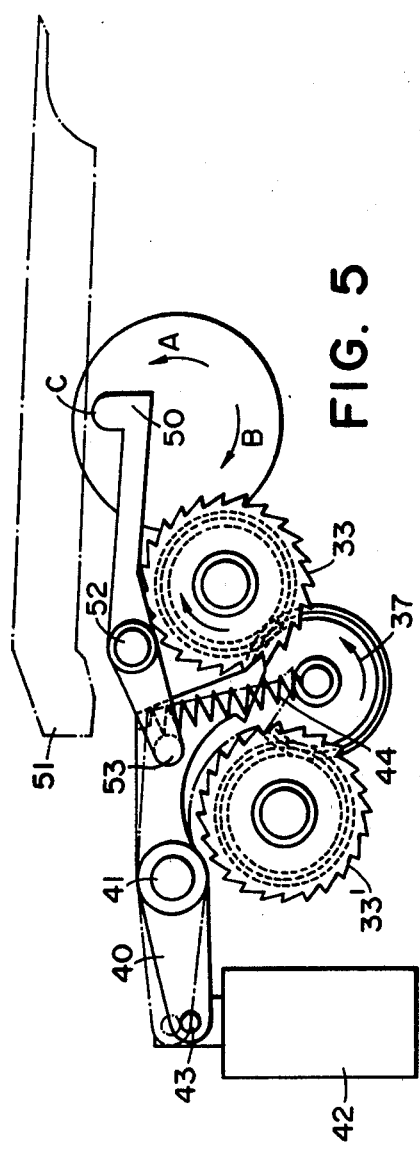
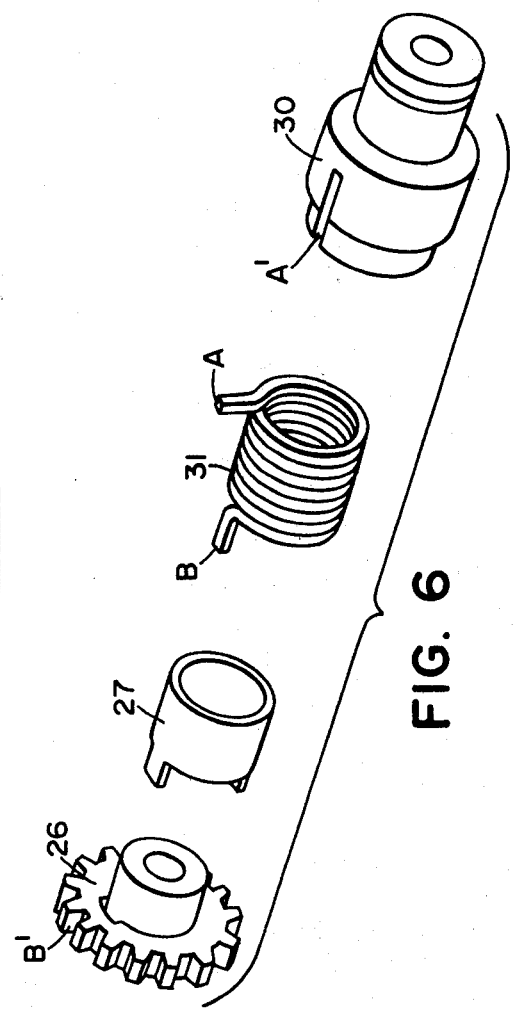
FIG. 5
FIG. 6

NORMAL AND REVERSE ROTATING MECHANISM

BACKGROUND OF THE INVENTION

1. Field of the Invention

This invention relates to a normal and reverse rotating mechanism for a rotating member or the like, and more particularly to an excellent normal and reverse rotating mechanism which is applicable to every normal and reverse rotating mechanism to effect normal and reverse rotations of a rotating member or the like, for example, a rotating member for the reciprocating mechanism of an original carriage or the reciprocating mechanism of an optical system in a copying apparatus or the like.

2. Description of the Prior Art

The normal and reverse rotating mechanism for a rotating member or the like has heretofore been of the type in which a driving motor or the like is directly rotated in normal and reverse directions or of the type in which a drive source is selectively changed over to separate gears for forward movement and backward movement by an electromagnetic clutch or the like. In the former type, the drive source must be directly rotated in normal and reverse directions, and in the latter type, normal and reverse rotations of the drive source itself need not be effected, whereas there is a disadvantage that a complicated and bulky mechanism such as an electromagnetic clutch is involved.

SUMMARY OF THE INVENTION

Therefore, the present invention intends to provide a normal and reverse rotating mechanism which does not require normal and reverse rotations of the drive source itself and does not require a bulky and complicated mechanism such as an electromagnetic clutch but which can reliably effect normal and reverse rotations of a rotating member by a simple construction, namely, by the use of spring clutches.

The construction which achieves the above object of the present invention is a normal and reverse rotating mechanism characterized by the provision of a normal and reverse rotating member capable of normal and reverse rotations, a first rotation transmitting member for transmitting normal rotation to the normal and reverse rotating member, a second rotation transmitting member for transmitting reverse rotation to the normal and reverse rotating member, a drive source rotatable in one direction for imparting a rotational drive to the normal and reverse rotating member, first spring clutch means for operatively associating the first rotation transmitting member and the drive source with each other, second spring clutch means for operatively associating the second rotation transmitting member and the drive source with each other, and control lever means for controlling the first and second spring clutch means so that when one of the two spring clutch means is operatively associated with the drive source, the other spring clutch means is not operatively associated with the drive source.

With the above-described construction of the present invention, the drive source need not be rotated in normal and reverse directions and an electromagnetic clutch or the like need not be used and normal and reverse rotations of the rotating member or the like can be effected by simply controlling the spring clutch means by the control lever means. Also, simply by change-over of the control lever means, transmission of normal and reverse rotations can be reliably accomplished without interference between the normal and reverse rotations.

The invention will become more fully apparent from the following detailed description thereof taken in conjunction with the accompanying drawings.

BRIEF DESCRIPTION OF THE DRAWINGS

FIG. 5 is a front view showing the control lever portion thereof.

FIG. 6 is an exploded view showing the essential portions of the present invention.

DESCRIPTION OF THE PREFERRED EMBODIMENTS

Figure 1:
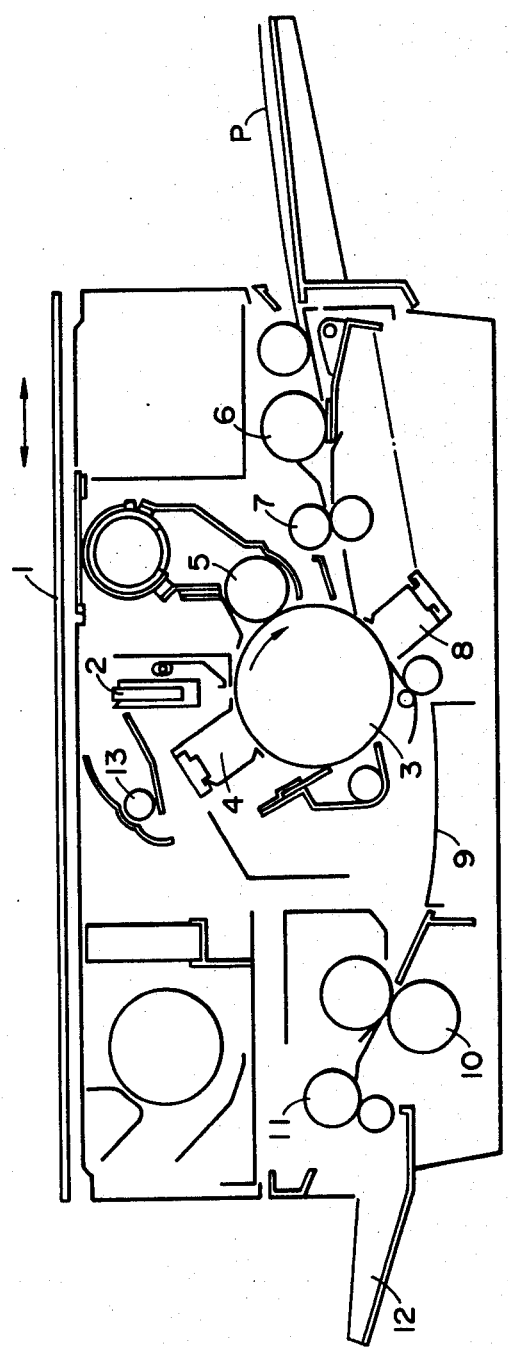
FIG. 1 is a schematic cross-sectional view of a copying apparatus to which the present invention is applicable.

An embodiment of a copying apparatus to which the present invention is applicable will first be described. Referring to FIG. 1, reference numeral 1 designates an original carriage comprising a transparent member and having an original supporting portion and reciprocable in the direction of the double-headed arrow. Denoted by 2 is a convergent light transmitting member.

The image of an original on the original carriage 1 may be slit-projected onto a photosensitive drum 3 rotated in the direction of the arrow. Reference numeral 4 designates a charger for uniformly charging the photosensitive drum 3. Designated by 5 is a developing device. An electrostatic latent image of the original may be formed on the uniformly charged photosensitive drum 3 through the convergent light transmitting member 2 and visualized by the developing device 5. On the other hand, transfer paper P may be fed onto the photosensitive drum 3 by a paper feed roller 6 and a pair of register rollers 7 rotated in timed relationship with the image on the photosensitive drum 3, whereby the image on the drum 3 may be transferred to the transfer paper by an image transfer charger 8, whereafter the transfer paper may be separated from the drum 3 by separating means and guided by a guide 9, and then the toner image on the transfer paper P may be fixed thereon by a fixing device 10, and subsequently the transfer paper P may be conveyed and discharged onto a tray 12 by discharge rollers 11.

Figure 2:
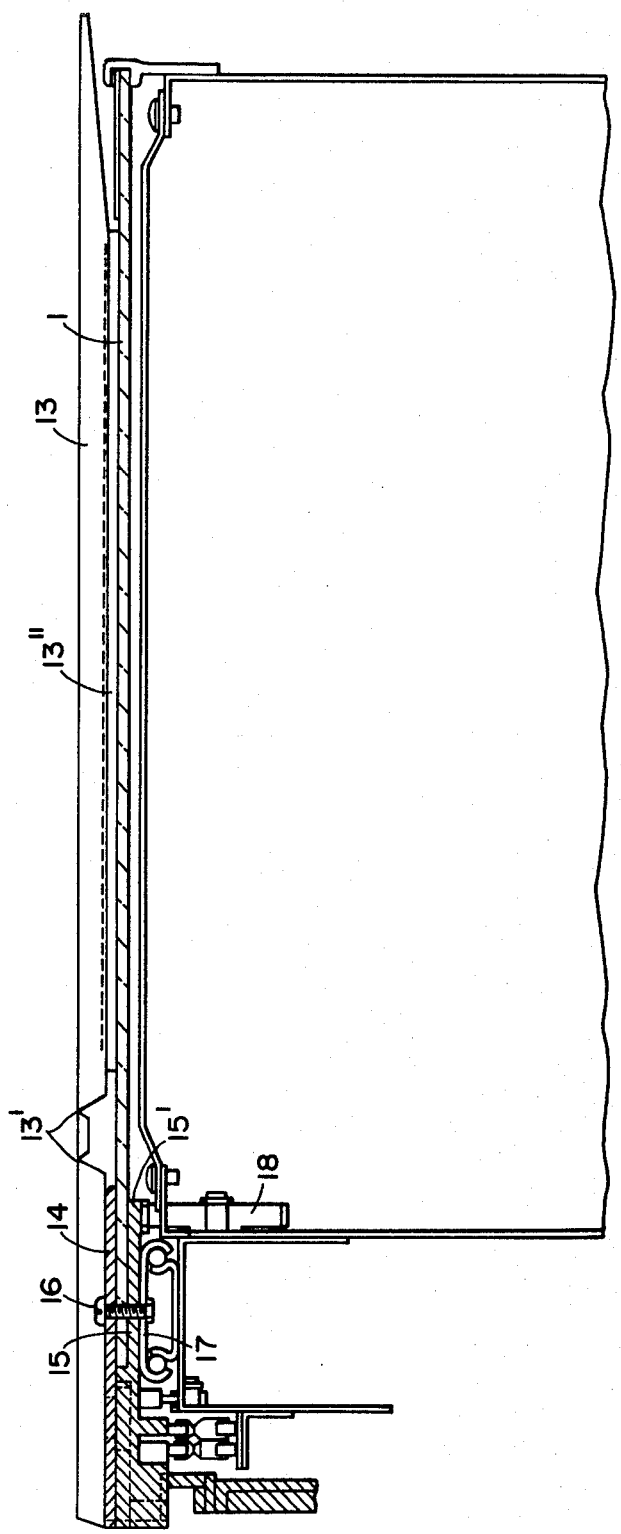
FIG. 2 is an enlarged view showing the reciprocable original carriage portion of the copying apparatus.
Figure 3:
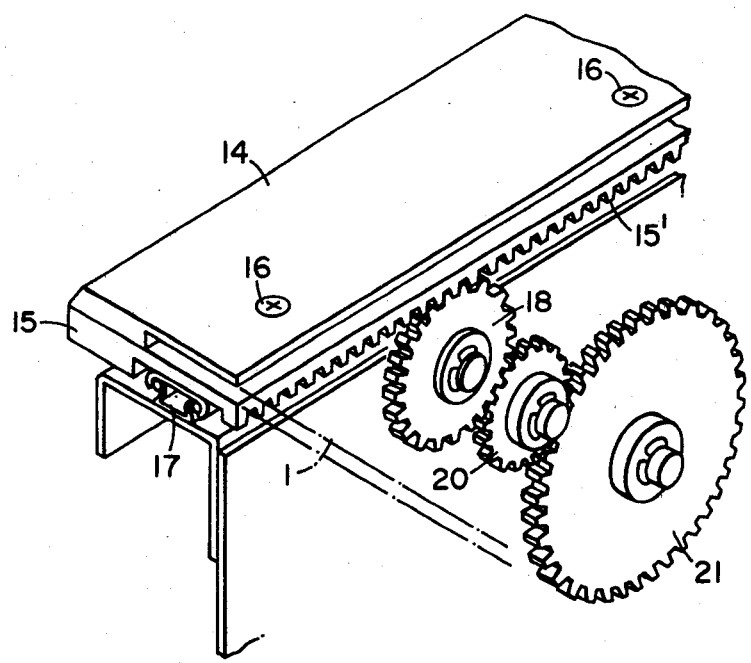
FIG. 3 is a perspective view showing the major driving portion thereof.

Reference is now had to FIGS. 2 and 3 to describe a portion for moving the original carriage.

An original pressing plate 13 serves to hold down the original placed on the transparent original carriage 1 and, in the case of the present embodiment, it is made up of a unitary base plate of polypropylene and includes a hinge portion 13' by using polypropylene, and a white pressing sheet 13" is attached thereto with a sponge-like cushion interposed therebetween. Designated by 15 is an original carriage attachment member made of a plastic material such as polycarbonate or duracon and secured to a slide rail 17 by means of a screw 16. The original carriage attachment member 15 has a rack 15' and the original carriage 1 is reciprocable by normal and reverse rotations of an original carriage driving gear 18 on the body side.

Figure 4:
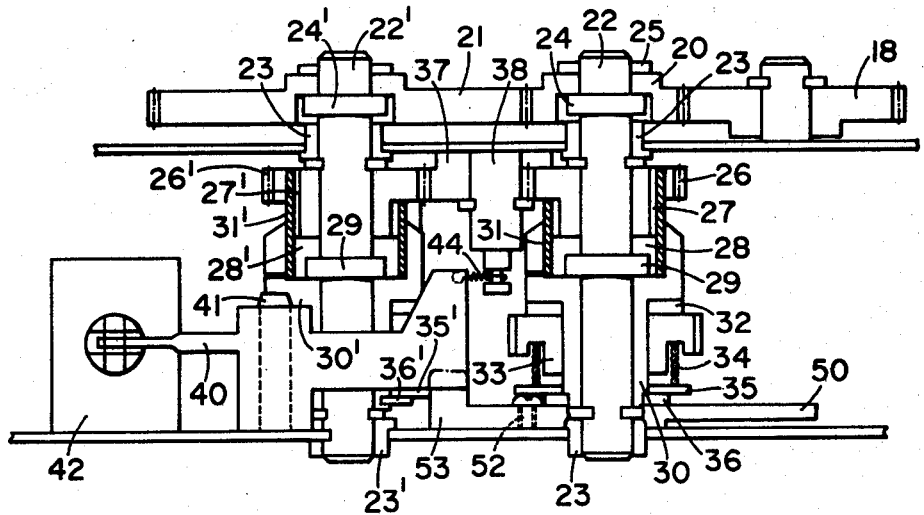
FIG. 4 is a cross-sectional view showing the normal and reverse rotating mechanism of the present invention.

Reference is now had to FIGS. 4, 5 and 6 to describe the original carriage reciprocating mechanism according to the present invention.

A gear for forward movement (a first rotation transmitting member) 20 engaged with the original carriage driving gear (normal and reverse rotating member) 18 is secured to a shaft 22 rotatably journalled to a bearing 23, by means of a pin 24 and a grip ring 25. A gear 26 is rotatable relative to the shaft 22, and a coupling 27 is fitted in the boss portion of the gear 26 as shown in FIG. 6. A drum 28 has an outside diameter equal to the outside diameter of the coupling 27 and is secured to the shaft 22 by means of a pin 29. A spring clutch receiver 30 is rotatable relative to the shaft 22 and a portion A of a clutch spring 31 (FIG. 6) is fitted in a groove A' (FIG. 6).

On the other hand, a portion B of the spring 31 is fitted in a portion B' of the gear 26. A friction plate 32 is freely mounted to a ratchet wheel 33 and the spring clutch receiver 30. The ratchet wheel 33 has ratchet teeth thereon as shown in FIG. 5. A pressure spring 34 presses the ratchet wheel 33 toward the friction plate 32 side. The ratchet wheel 33 is rotatably fitted on the spring clutch receiver 30. The other end of the pressure spring 34 is held down by a washer 35 and a fastening washer 36. A shaft 22' is also provided thereon with parts similar to the parts 23 through 36 provided on the shaft 22. However, a gear for backward movement (a second rotation transmitting member) 21, instead of the gear 20 for forward movement, is secured to the shaft 22'. The gears 20 and 21 are in mesh engagement with each other, and the gear 26' on the shaft 22' side and the gear 26 on the shaft 22 side are in mesh engagement with a gear 37. The gear 37 is rotatably supported on a shaft 38 secured to the body. That is, both of the gear 20 for forward movement and the gear 21 for backward movement provide a final output transmitting portion to the gear 26 of the present normal and reverse rotating mechanism. A stopper 40 is rotatably supported on a shaft 41 secured to the body, one end of the stopper 40 being freely connected to a solenoid 42 through a pin 43 and the other end of the stopper 40 being pulled by a spring 44 in the direction from its solid-line position to its dot-and-dash line position. Accordingly, when the solenoid 42 is operated, the stopper 40 assumes its solid-line position with a part thereof brought into mesh engagement with a ratchet tooth of the ratchet wheel 33 on the shaft 22 side, and when the solenoid 42 is deenergized, the stopper 40 is brought to its dot-and-dash line position by the force of the spring 44 with a part of the stopper meshing with a ratchet tooth of the ratchet wheel 33' on the shaft 22' side.

When the original carriage returns to its home position, a portion C of a lever 50 is downwardly pushed by a cam 51 provided on the original carriage attachment member, so that the lever 50 moves about a shaft 52 and a pin 53 at the other end of the lever 50 brings the stopper 40 from its dot-and-dash line position to a position in which the stopper 40 does not touch the ratchet wheel 33.

Operation of this normal and reverse rotating mechanism will now be described. Description will first be made of the situation when the solenoid 42 has been operated and the stopper 40 has been brought to its solid-line position shown in FIG. 5. The drive from a driving roller, not shown, is rotating the gear 37. The rotation of this gear 37 is transmitted to the gear 26 on the shaft 22 side on the one hand, and transmitted to the gear 26' on the shaft 22' side on the other hand. When the gear 26 on the shaft 22 side is rotated, the spring clutch receiver 30 is also rotated through the spring 31, but the stopper 40 is engaged with a ratchet tooth of the ratchet wheel 33 to thereby stop the ratchet wheel 33 and therefore, the friction plate 32 assumes a direction in which it stops rotating, and at this time, the spring clutch receiver 30 also tries to stop through the friction plate 32. The clearance between the inside diameter of the spring 31 and the outside diameters of the drum 28 and coupling 27 is in the range of about 10μ to about 100μ and, since the spring receiver 30 tries to stop, the spring clutch 31 is squeezed and tightened to the outside diameters of the drum 28 and coupling 27. Accordingly, the rotation of the gear 26 is transmitted from the coupling 27 through the spring 31 and the drum 28 to the spring clutch receiver 30 and the shaft 22 to thereby rotate these. Thus the spring clutch receiver 30 and the stopped ratchet wheel 33 are slidingly rotated through the friction plate 32. On the other hand, since the ratchet wheel 33' is not stopped, the spring 31 is not tightened to the drum 28 and accordingly, the rotation of the gear 26 is not transmitted to the shaft 22'.

That is, the rotational force of the gear 37 rotates the shaft 22, rotates the original carriage driving gear 18 in the direction of arrow A in FIG. 5 through the gear 20 for forward movement, moves the original carriage forwardly, and deenergizes the solenoid 42 by detecting means, not shown, when the original carriage is moved foward to a predetermined position, and the stopper 40 is brought to its dot-and-dash line position by the force of the spring 44 to stop the ratchet wheel 33' on the shaft 22' side this time. Thereupon, by the operation as previously described, the shaft 22' rotates the gear 37 through the gear 26 and this rotation is transmitted to the gear 21 to rotate the original carriage driving gear 18 in the direction of arrow B through the gear 20 for forward movement, and if the number of teeth of the gear 21 for backward movement is selected to be greater than that of the gear 20 for forward movement, the backward movement of the original carriage can take place at a speed faster than the forward movement and the speeds of the forward and backward movements can be simply varied as desired, and this leads to an increased copying speed.

Thus, the great feature of the present construction is that only when it is desired to increase the speed of the backward movement, the number of teeth of the gear 20 for forward movement is made to differ from the number of teeth of the gear 21 for backward movement and the clutch mechanism for forward movement and the clutch mechanism for backward movement may be entirely identical to each other.

What we claim is:

1. A normal and reverse rotating mechanism comprising:
   a member movable in normal and reverse directions;
   a first rotation transmitting member normally and reversely rotatable for transmitting normal and reverse movement to said movable member;
   a second rotation transmitting member normally and reversely rotatable and in engagement with said first rotation transmitting member;

a drive source rotatable in one direction for imparting a rotational drive to said first and second rotation transmitting members;

first spring clutch means for connecting said first rotation transmitting member with said drive source to impart normal rotation to said first rotation transmitting member;

second spring clutch means for connecting said second rotation transmitting member with said drive source to impart reverse rotation to said first rotating transmitting member; and control means for alternately actuating said first and second spring clutch means.

2. A mechanism according to claim 1, wherein said control lever means cooperates with said spring clutch means to which the drive is transmitted to interlock the drive.

3. A mechanism according to claim 1, further comprising means for holding said control lever means in a neutral position in which said control lever means acts on neither of said spring clutch means.

4. A mechanism according to claim 1, wherein said first and second rotation transmitting members are gears and wherein said first rotation transmitting member transmits the rotational drive of said second rotation transmitting member to said movable member.

* * * * *